US008414227B2

(12) United States Patent
Tardif

(10) Patent No.: US 8,414,227 B2
(45) Date of Patent: Apr. 9, 2013

(54) CONTROLLED VACUUM COLLECTION DEVICE AND METHOD THEREOF

(76) Inventor: Gilles Tardif, Levis (CA)

(*) Notice: Subject to any disclaimer, the term of this patent is extended or adjusted under 35 U.S.C. 154(b) by 264 days.

(21) Appl. No.: 12/552,562

(22) Filed: Sep. 2, 2009

(65) Prior Publication Data

US 2010/0059136 A1 Mar. 11, 2010

Related U.S. Application Data

(60) Provisional application No. 61/136,491, filed on Sep. 9, 2008.

(51) Int. Cl.
*B65G 51/16* (2006.01)

(52) U.S. Cl. .............. 406/19; 700/230; 406/21; 406/51; 406/122; 406/151

(58) Field of Classification Search .................... 453/16, 453/17; 232/12; 406/19, 21, 24, 51, 122, 406/151, 152, 153; 141/8, 67; 194/202, 194/339; 700/230
See application file for complete search history.

(56) References Cited

U.S. PATENT DOCUMENTS

| | | | | |
|---|---|---|---|---|
| 3,843,203 | A | 10/1974 | Golland et al. | |
| 3,979,054 | A * | 9/1976 | Graham | 232/43.2 |
| 4,210,801 | A | 7/1980 | Gomez et al. | |
| 4,372,478 | A * | 2/1983 | Gomez et al. | 232/12 |
| 4,460,003 | A * | 7/1984 | Barnes et al. | 453/17 |
| 4,466,453 | A * | 8/1984 | Said et al. | 453/8 |
| 5,067,928 | A * | 11/1991 | Harris | 453/17 |
| 5,574,441 | A | 11/1996 | Roes et al. | |
| 5,954,576 | A * | 9/1999 | Coulter et al. | 453/17 |
| 6,125,988 | A * | 10/2000 | Waters | 194/217 |
| 6,626,749 | B2 * | 9/2003 | Neborsky et al. | 453/17 |
| 6,736,317 | B1 | 5/2004 | McDonald et al. | |
| 7,469,817 | B2 * | 12/2008 | Brumfield et al. | 232/7 |
| 7,992,699 | B2 * | 8/2011 | Adams et al. | 194/217 |

FOREIGN PATENT DOCUMENTS

WO 2005/031656 A1 4/2005

* cited by examiner

*Primary Examiner* — Joseph A Dillon, Jr.
(74) *Attorney, Agent, or Firm* — Ladas & Parry LLP

(57) ABSTRACT

A device for collecting items from a container comprises a collection unit, a conduit, a vacuum producing unit and a controller. The conduit is in fluid communication with the collection unit and is mountable to the container so as to be placed in fluid communication therewith. The vacuum producing unit produces a vacuum within the conduit. The controller is linked to the vacuum producing unit and is configured to acquire data regarding the contents of the container. When the controller receives data regarding the contents of the container it controls the vacuum producing unit to modulate the vacuum produced within the conduit thereby suctioning the items within the container when mounted thereto into the collection unit. The container can be a transit fare box for receiving items tendered for fare. The data regarding the contents of the container can be the volume of items within the container.

10 Claims, 5 Drawing Sheets

CONTROLLED VACUUM COLLECTION DEVICE AND METHOD THEREOF

CROSS-REFERENCE TO RELATED APPLICATIONS

The present application is based on priority U.S. Provisional Application Ser. No. 61/136,491 filed on Sep. 9, 2009 and incorporated herein by reference in its entirety.

FIELD OF THE INVENTION

The present invention relates to device for collecting elements or items via a vacuum. More specifically but not exclusively, the present invention relates to device for collecting items tendered for fare from a transit fare box. More particularly but not exclusively, the present invention relates controlled vacuum collection devices, systems and methods

BACKGROUND OF THE INVENTION

A variety of methods and devices for collecting coins and receipts from the fare boxes of various public transportation vehicles such as buses are taught in the art.

It is known in the art to pneumatically transfer the contents of the fare box of a public transit bus to a processing center where the coins are sorted according to their denomination into compartments within a vault. Specifically, a conduit having a probe at one end is connected to the fare box and sucks the coins via a vacuum towards a processing center at the other end of the conduit. It is also known in the art to transmit the data of the fare box or of the vault (storage unit) to a central processing centre which can receive data regarding all buses and all routes. In other systems A drawback of known systems is that the removal or collection of coins from the fare box cannot be modulated based on the contents therein providing systems which are inconvenient and sometimes incapable of removing all the contents of the fare box and other times damaging the tickets in the fare box by using too much suction.

OBJECTS OF THE INVENTION

An object of the present invention is to provide a device for collecting items from a container.

An object of the present invention is to provide a system for controlling the collection of items.

An object of the present invention is to provide a method of controlling the collection of items from a container.

An object of the present invention is to provide a system for monitoring the amount of items tendered for fare in transit vehicle fare boxes.

SUMMARY OF THE INVENTION

In accordance with an aspect of the present invention, there is provided a device for collecting items from a container, the device comprising:

a collection unit for collecting the items therein;

a conduit in fluid communication with the collection unit and being mountable to the container so as to be placed in fluid communication therewith;

a vacuum producing unit for producing a vacuum within the conduit; and a controller linked to the vacuum producing unit and configured to acquire data regarding the contents of the container;

wherein when receiving data regarding the contents of the container, the controller so controls the vacuum producing unit as to modulate the vacuum produced within the conduit thereby suctioning the items within the container when mounted thereto into the collection unit.

In an embodiment, the controller receives information from the container via a processor mounted to the container. In the data regarding the contents of the container comprises the volume of items within the container.

In an embodiment, after suctioning the items from the container into the collection unit, the controller is so configured as to determine the volume of the items within the collection unit.

In an embodiment, the controller modulates the vacuum in the conduit in accordance with the amount of items in the container.

In accordance with an aspect of the present invention, there is provided a system for controlling the collection of items comprising:

a plurality of the devices for collecting items from at least one respective container; and a central controller mounted to each the controller of each the device for receiving data therefrom regarding the contents of each the at least one respective container In an embodiment, each device provides for collecting items from a plurality of containers, each controller of each device configured to acquire data regarding the contents of each container of the plurality of containers and to transmit this data to the central controller.

In accordance with an aspect of the present invention, there is provided a system for controlling the collection of items comprising:

at least one container for placing items therein;

a processor in communication with the container so as to detect the amount of items being placed therein;

a controller in communication with the processor for receiving data regarding the contents of the container; and a collection unit linked to the controller for control thereof and comprising a conduit for being mounted to the container and a vacuum producing unit for producing a vacuum within the conduit, wherein when mounting the conduit to the container, the controller so controls the vacuum producing unit as to modulate the vacuum produced within the conduit in accordance with the received data thereby so as to suction the item within the container into the collection unit.

In accordance with an aspect of the present invention, there is provided a method of controlling the collection of items from a container, the method comprising:

remotely determining the contents of the container;

placing a collection unit in fluid communication with the container;

providing a vacuum between the container and the collection unit so that items from the container are suctioned into the collection unit; and modulating the intensity of the vacuum in accordance with the contents of the container.

In accordance with an aspect of the present invention, there is provided a system for monitoring the amount of items tendered for fare in transit vehicle fare boxes, the system comprising:

a plurality of fair boxes for receiving items tendered for fare therein, each the fare box being mounted to a transit vehicle;

a processor mounted to each fair box for detecting the amount of items therein; and a controller remote from the plurality of fare boxes and in communication with each processor thereof so as to receive data regarding the amount of items in each fare box.

In en embodiment, there is provided a location sensor linked is to each fare box and in communication with the controller so as to determine the location of each fare box within a transit circuit and to transmit this data to the controller.

Other objects, advantages and features of the present invention will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated, the present invention, in an embodiment, thereof is concerned with devices, methods and system using frequency communication for controlled vacuum collection of items from containers. The items can include money, coins, receipts, tokens, bills in fare boxes used in transport vehicles such as buses. Of course, the present system can be used in other areas as well. In an embodiment, the present invention is concerned with a radio frequency communications device used particularly but not exclusively to transfer information relative to a vacuum controlled collection device so as to modulate the vacuum pressure thereof and as such the collection process itself. The collection system provides for collecting the receipts, moneys and coins directly into the integrated collection module from the fare box of the transport vehicle without any human contact therewith. Thus the system includes a collection module that is vacuum controlled as well as a radio frequency communications device (RF device).

In an embodiment, the device comprises a collection unit, a vacuum producing unit, a conduit and a controller. The conduit is connected to the vacuum providing unit and is in fluid communication with the collection unit. The conduit is also mountable to the container so as to be placed in fluid communication therewith. The controller is linked to the vacuum providing unit and is configured to acquire data regarding the contents of the container. When the controller has received data regarding the contents of the container it signals the vacuum providing unit so as to modulate the created vacuum thereby correspondingly suctioning the items within the container into the collection unit.

With reference to the accompanying drawings non-limiting illustrative embodiments of the present invention will be described.

Figure 1:
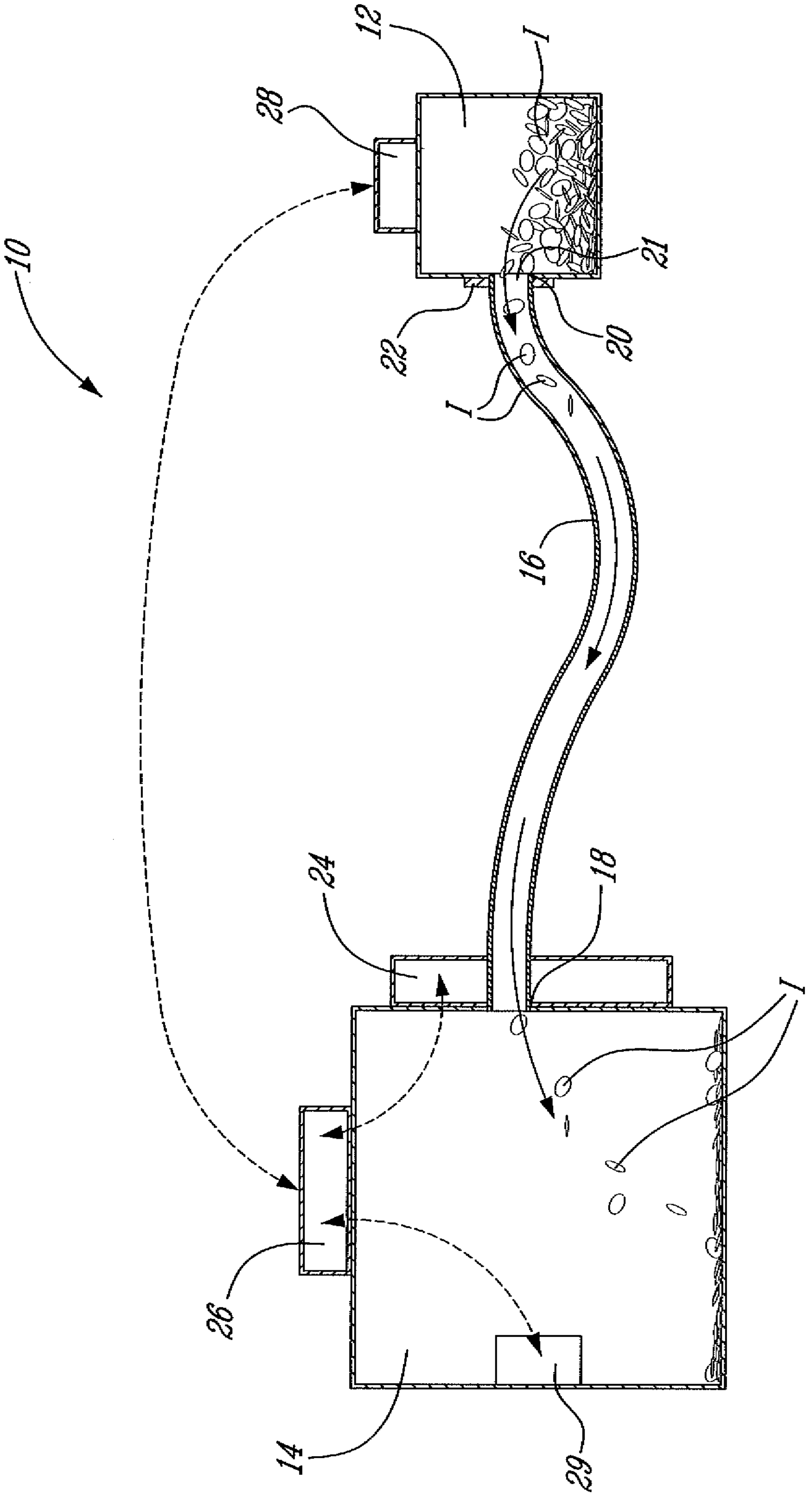
FIG. 1 is schematic representation of the device for collecting items I from a container via a controlled vacuum in accordance with a non-restrictive illustrative embodiment of the present invention.

FIG. 1 shows a device 10 for collecting items I from a container 12 such a fare box used in transit vehicles to provide one non-limiting example. The items collected therefore can be items tendered for fare such as currency, bills, coins, tickets, receipts, fare cards and the like.

The device 10 includes a collection unit 14, such a vault. A conduit 16, such as a hose in fluid communication with the collection unit 14 at on end 18 thereof. The conduit 16 includes a free end 20 which can be a collection probe. The free end 18 includes an opening 21 and is mountable to a mounting element 22 on the container 12. As is known in the art, the mounting element 22 can include a locked slot, door or cover (not shown) that is opened when the conduit 16 engages it.

In other known containers, this door or cover is unlocked and opened before the conduit 16 engages it. Since fare boxes and security containers are well known in the art and quite diverse in structure and configuration, the present container 12 need not be described further. A variety of fare box structures known in the art can be provided within the context of the present invention. It is well known to first mount a vacuum conduit or probe onto a locked vault about a probe receiving element surrounding a locked door member and to then unlock the door member. Of course other types of probes, conduits and fare boxes can be used within the context of the present invention. For example, the door element or cover of the out-feed opening can be opened in a variety of ways before the collection probe or after the collection probe engages the fare box.

The device 10 includes a vacuum producing unit 24 such as a vacuum pump or any other pneumatic device that provides for producing a vacuum as is well known in the art. As is also well known in the art, the vacuum producing unit 34 is in communication with the conduit 16 thereby creating a vacuum therein as well as modulating the intensity of the vacuum as will be further explained herein. In the schematic example, the vacuum producing unit 24 is mounted to the collection unit 14 and as such forms part of this unit 14. The conduit 16 is thus mounted at it end 18 to the collection unit 14 via the vacuum producing unit 24.

A controller 26 receives information about the contents of the fare box 12 via a processor 28.

Processors for measuring the amount of items within containers are well known in the art. For example, it is well known in the art to include fare box with electronic receiving slots that count the value of the bills or coins or tokens placed in the fare box. These fare boxes can track the value of money placed therein as well as the amount of items that have been collected in terms of volume and not value.

The processor 28 therefore provides the controller 26 with information regarding the amount of items stored within the fare box 12. More specifically, the processor 28 transmits information regarding the content volume of the fare box 12. The information provided to the controller 60 includes the amount of receipts, coins, bills, tokens and the like.

The controller 26 transmits a control signal to the vacuum producing unit 24 and to produce a given vacuum intensity. More specifically and as is know in the art, the vacuum producing unit 24 can modulates the intensity of vacuum produced within the conduit 16. This intensity can be modulated between relatively high and low vacuum force as well as several intervals therebetween. The controller 26 transmits a signal to the vacuum producing unit 24 to produce a vacuum at a given intensity. This vacuum intensity is modulated in accordance with information received by the controller 36 from the processor 28. As such, a controlled predetermined vacuum is provided within conduit 16 which suctions the contents out of the fare box 12 and into the collection unit 14.

Hence, the greater the contents of the fare box 18 the greater the vacuum needed and vice versa.

The control unit 14 is also shown including a sensor 29 which detects the amount of items I therein. The sensor 29 is in communication with the controller 26 and provides the foregoing information thereto. As such, the controller 26 can verify after the above suctioning operation if whether the volume of the contents if items I in the collection unit 14 corresponds to the volume of the contents in the container 12 preceding the suctioning operation.

Communication between the controller 26 and the processor 28 and can be provided by radio frequency (RF) communication or any other like communication as the skilled artisan will readily appreciate.

The sensor 29 can be linked to the controller via a wire or wireless link.

The device 10, processor 28 and container 12 provide a system for controlling the collection of items.

The controller 24 is shown to be mounted to the collection unit 14 but it can be remote from the unit 14.

The vacuum producing unit 24 can be integrated to the collection unit 14.

Figure 2:
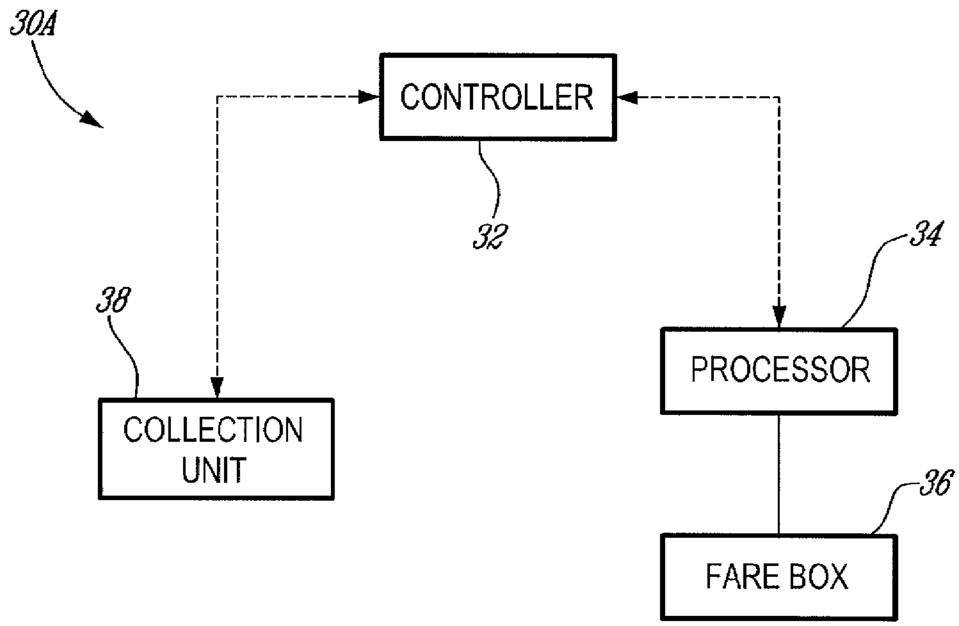
FIGS. 2 to 8 are schematic representation of the systems for controlled vacuum collection of items from containers in accordance with respective non-restrictive illustrative embodiment of the present invention.

FIG. 2 shows a system 30A for controlled vacuum collection including a controller 32 (or a microcontroller) being linked via a wireless connection to a processor 34 linked to a fare box 36 and a collection unit 38 via a wireless link. The collection unit 38 includes an integrated vacuum producer modulated by the controller 34.

Figure 3:
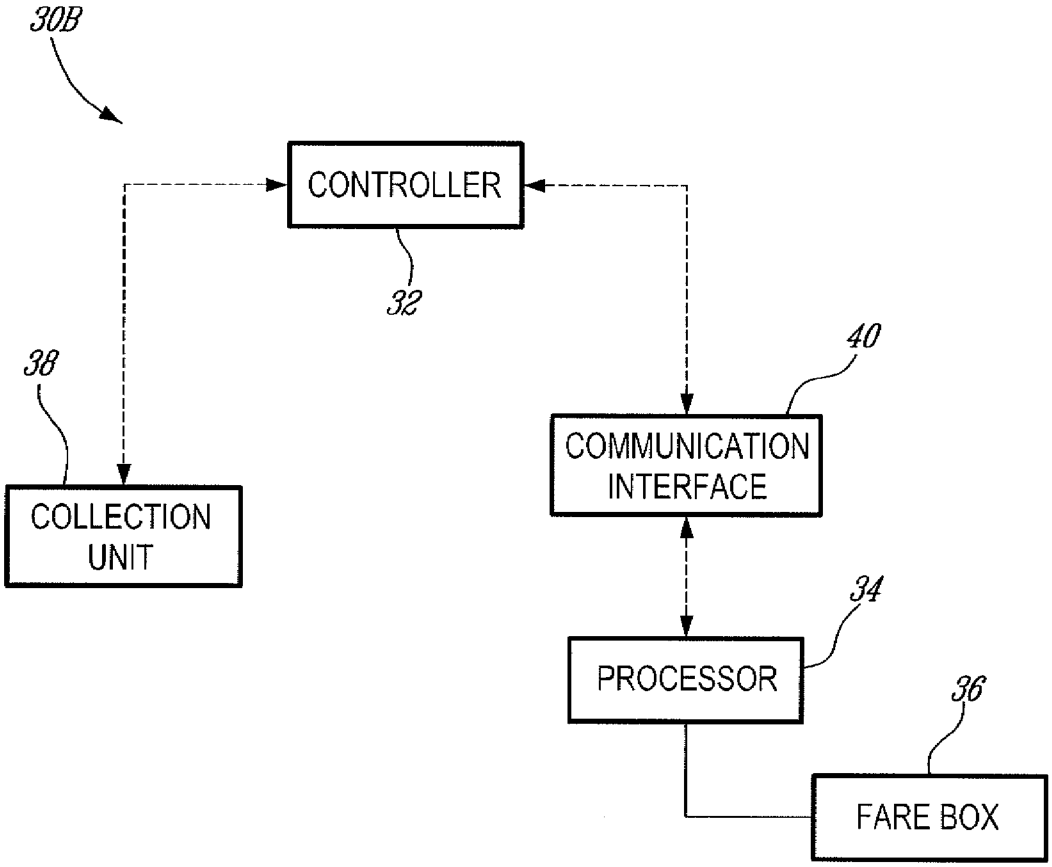

FIG. 3 shows a system 30B for in which the controller 32 is linked to the fare box processor 34 via a communications interface 40 which can be in the form of an antenna with an integrated circuit for example.

Figure 4:
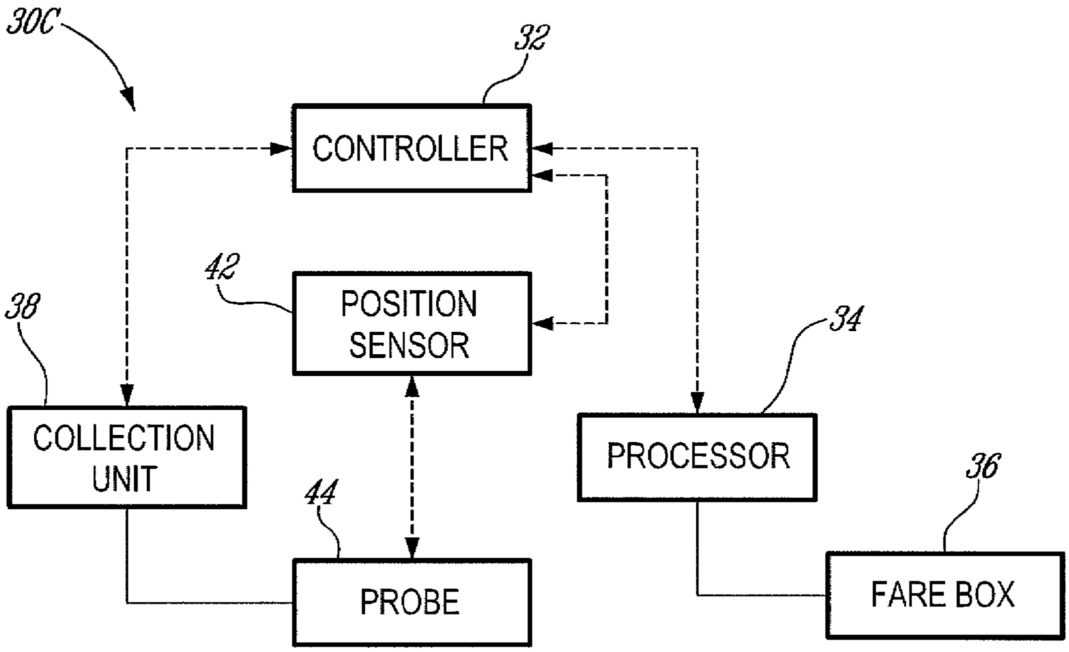

FIG. 4 shows a system 30C for controlled vacuum collection similar to system 30A and further comprising a position sensor 42 in order to assess the position of the probe 44 of the collection unit.

Figure 5:
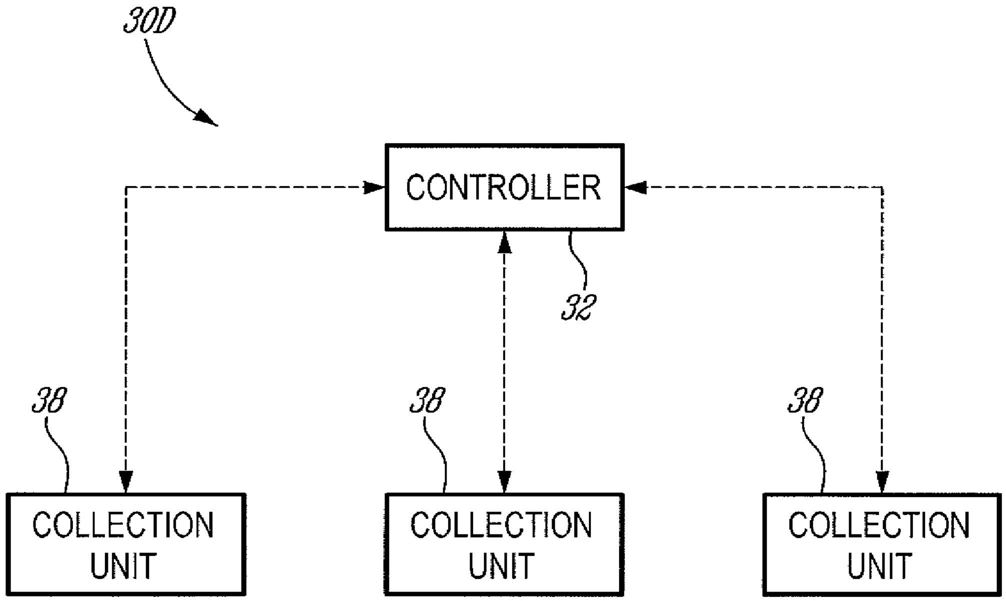

FIG. 5 shows a system 30D for controlled vacuum collection wherein the controller 32 is linked to a plurality of collection units 38 for modulating the vacuum force produced thereby.

Figure 6:
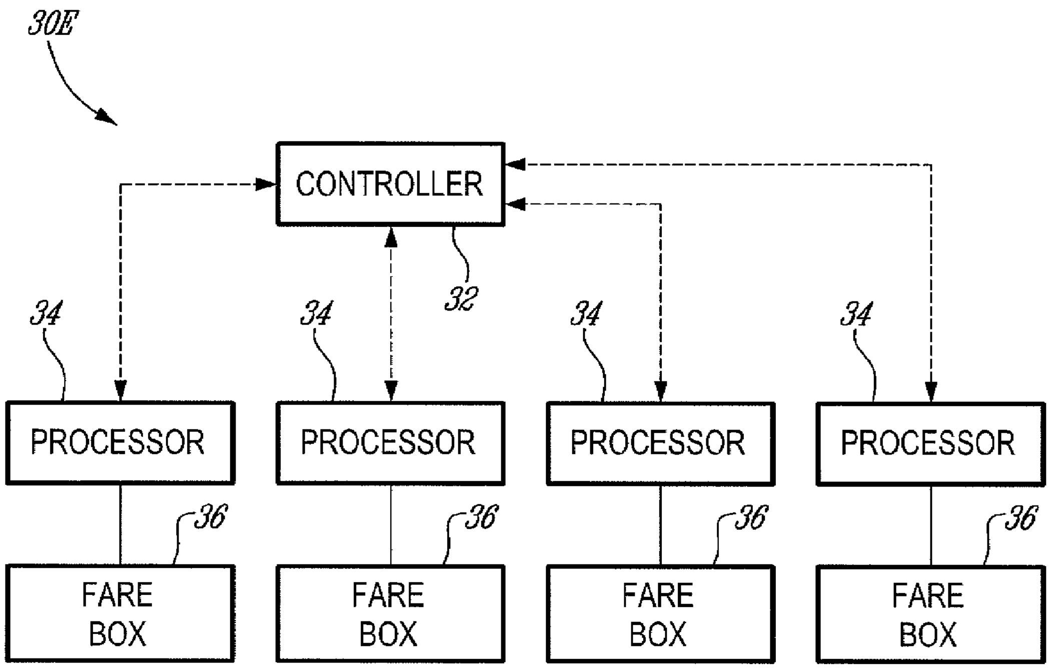

FIG. 6 shows a system 30E for controlled vacuum collection wherein the controller 32 is linked to a plurality of processors 34 and fare boxes 36.

Figure 7:
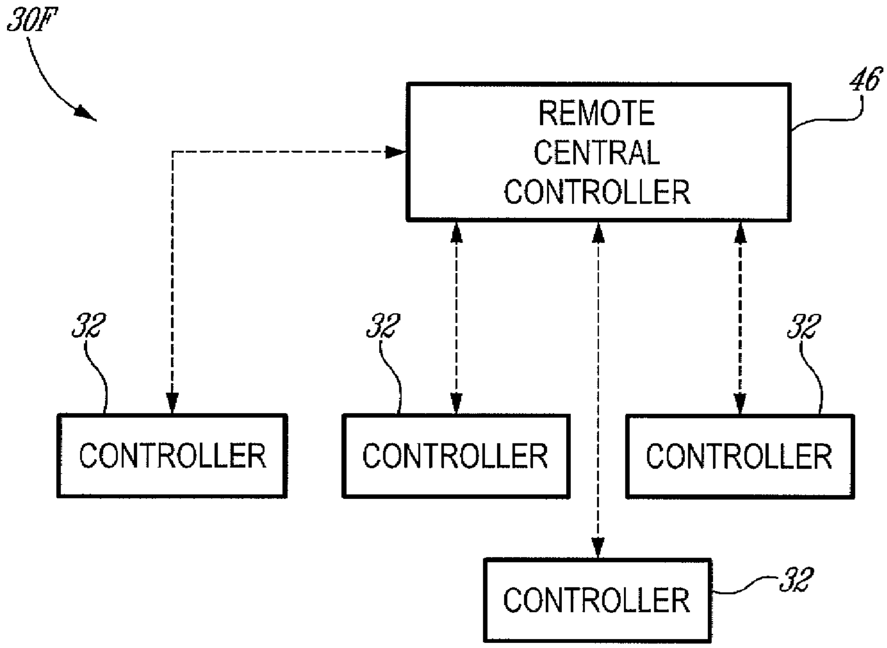

FIG. 7 shows a system 30F for controlled vacuum collection comprising a remote central controller 46 linked to a plurality of controllers 30 for control thereof.

Figure 8:
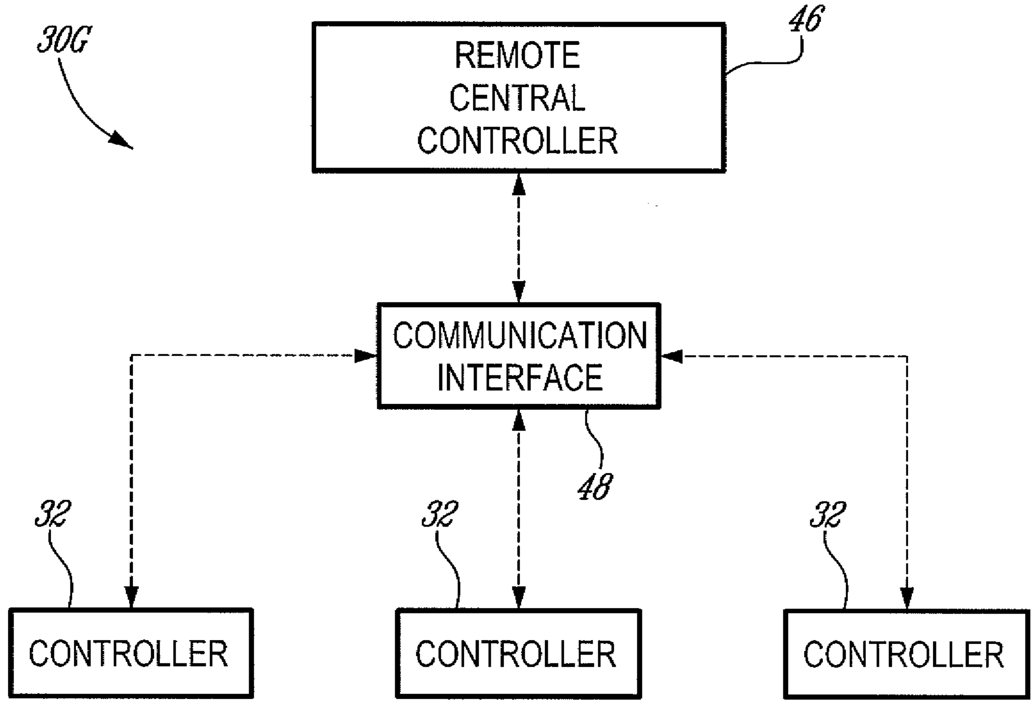

FIG. 8 shows a system 30G for controlled vacuum collection similar to system 30F but including a communication interfaces for providing communication between the controllers 32 and the remote central controller 46.

Figure 9:
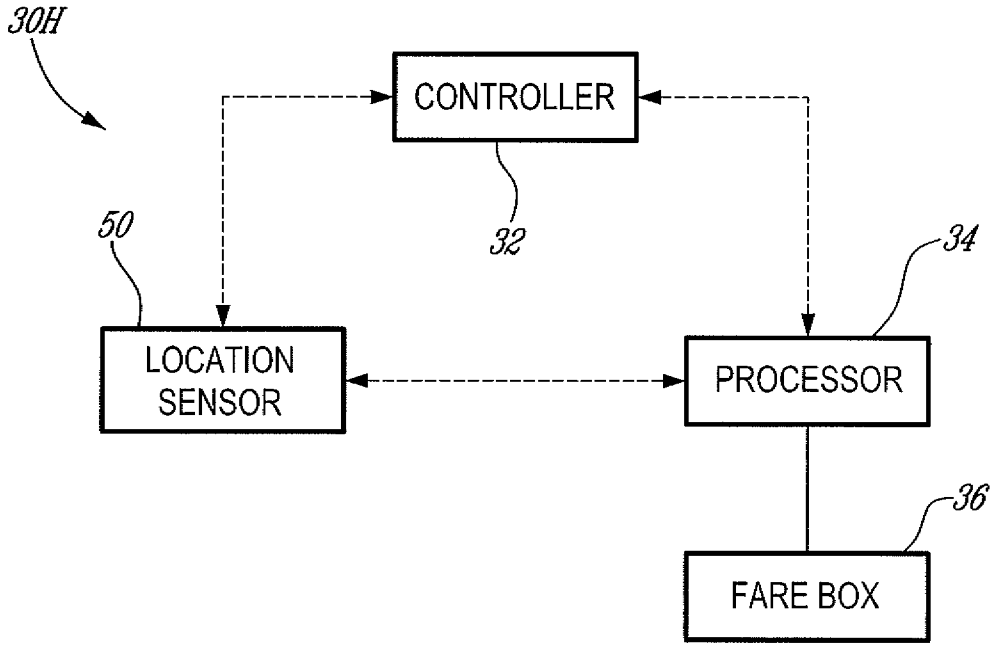
FIG. 9 is a schematic representation of a system for controlled vacuum collection of items tendered for fare from transit fare boxes and for monitoring the location of the fare boxes within a transit route.

FIG. 9 shows a system 30H for controlled vacuum collection and for monitoring the amount of items in transit vehicle fare boxes. The system 30G includes a controller 32 linked to the processor 24 of the fare box 36. A location sensor 50, such as a GPS, communicates with the processor 24 in order to determine the location of the fare box 36 along a transit circuit.

The various systems and devices described above can be combined in a variety of ways as will be understood by the skilled artisan to provide still other non-restrictive illustrative embodiments within the scope of the present invention.

In an embodiment, the communication interface 40 receives a signal from the fare box processor 34 and transmits this signal to the controller 32 which recognizes the fare box 36 and authorizes collection. The controller 30 then signals the collection unit 38 as such the collection probe 44 is ready to engage the fare box 36. The position sensor 42 recognizes the position of the collection probe 44 in order to transmit security instructions to the controller 30. More particularly, the position sensor 44 determines that the collection probe 44 has been mounted to the fare box 36. The controller 30 then sends a corresponding signal to the processor 34 which unlocks the fare box 36 in order to allow for the contents therein to be collected.

In one example, when a vehicle, such as bus, reaches a pre-authorized zone, such as a collection station, the fare box 36 is automatically identified by a code, such as an EPC code which is preprogrammed into the fare box processor 34 and which can be allotted to a given transport circuit or route.

In an embodiment, the location sensor 50 recognizes that the bus has reached the pre-authorized zone and sends this information to the controller 30.

The processor 34 transmits data concerning the contents of the fare box 36, in relation to its volume, density and EPC code to the controllers 30. The controller 30 receives and processes the foregoing data in order to transmit it, via the communications interface 48, to the central controller 46.

Therefore, once the fare box 36 of the vehicle has been identified and its contents evaluated, the vacuum can be adjusted and the contents are suctioned into the collection unit 38.

Furthermore, the central controller 46 receives information from each and every controller 32 and thus determines in real time the contents of each fare box 36 that is related to a given route as well as the amount of users that used that said route for different bus schedules (which can be determined at an hourly, daily, monthly, yearly etc. basis). Location sensors can monitor the location of each fare box 32 on a given vehicle within a given transit circuit. Moreover, information regarding the contents and location of the fare boxes 36 can be combined at the central controller 46 which receives real time information regarding the contents and location of each and every fair box.

In addition, the central controller 46 can receive information regarding the transfer of items I (see FIG. 1) from the fair box 36 to the collection unit 38 via a sensor 29 (see FIG. 1).

The skilled artisan will readily appreciate that variations of the all the foregoing information can be combined in various ways in order to provide a variety of accounting or assessment packages providing for producing statistical reports concerning the amount of users during various routes and various travel schedules as well as the efficiency of collection of items tendered for fare Nevertheless, it should be noted that the above described controlled vacuum suction systems can be used for other applications.

Although the present invention has been described hereinabove by way of non-restrictive illustrative embodiments thereof, it can be modified, without departing from the scope, spirit and nature of the subject invention.

What is claimed is:

1. A collection assembly comprising:

a plurality of containers for being mounted on transit vehicles for receiving items therein, each said container comprising a respective processor; for detecting the mass density of each item received therein in real-time a collection unit for collecting the items within each said container therein and comprising a sensor for sensing the mass density of the of the items collected therein;

a conduit in fluid communication with said collection unit and being mountable to each said container so as to be placed in fluid communication therewith;

a vacuum producing unit for producing a vacuum within said conduit for suctioning the items within each said container when said conduit is respectively mounted thereto; and a controller linked to said vacuum producing unit and configured to remotely and simultaneously communicate with each said processor so as to acquire data in real time regarding the total mass density of the items within each said container on a respective transit vehicle, said controller being in communication with said sensor for determining the mass density of the items within said collection unit, said controller providing for:

modulating the intensity of the vacuum produced within said conduit for suctioning the items within a given said container when said conduit is mounted thereto based on the data acquired from said processor of said given container regarding the total mass density of the items within said given container thereby suctioning the items within said container into said collection unit, and verifying if the mass density of items in said collection unit after suctioning increased by an amount equal to the mass density of items in said given container prior to suctioning.

2. A collection assembly according to claim 1, wherein said collection unit comprises a vault.

3. A collection assembly according to claim 1, wherein said conduit comprises a hose.

4. A collection assembly according to claim 3, wherein the hose comprises a probe for being mounted to the container.

5. A collection assembly according to claim 1, wherein said container comprises a fare box.

6. A collection assembly according to claim 1, wherein said vacuum producing unit comprises a vacuum pump.

7. A collection assembly according to claim 1, wherein said controller comprises a computer.

8. A collection assembly according to claim 1, wherein said controller and said processor communicate via RF communication.

9. A system for controlling the collection of items comprising:

a plurality of the devices of claim 1, each said device for collecting items from at least one respective container; and a central controller mounted to each said controller of each said device for receiving data therefrom regarding the contents of each said at least one respective container.

10. A system according to claim 9, wherein each said device provides for collecting items from a plurality of containers, each said controller of each said device configured to acquire data regarding the contents of each container of said plurality of containers and to transmit this data to said central controller.

* * * * *